United States Patent
Inuganti et al.

(10) Patent No.: US 10,448,277 B2
(45) Date of Patent: Oct. 15, 2019

(54) METHOD, SYSTEM AND APPARATUS FOR MULTICAST DATA RATE SELECTION

(71) Applicant: SYMBOL TECHNOLOGIES, LLC, Lincolnshire, IL (US)

(72) Inventors: Venkata Aneel Kumar Inuganti, Bangalore (IN); Satish Shivarudrappa, Bangalore (IN); Naga Babu Parsi, Bangalore (IN); Kishore Kumar Pathankanur, Bangalore (IN); Satyendra Kumar Veeramacha, Bangalore (IN); Madhusudhan Shivappa, Bangalore (IN); Yashas N S, Bangalore (IN)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/791,005

(22) Filed: Oct. 23, 2017

(65) Prior Publication Data
US 2019/0124540 A1    Apr. 25, 2019

(51) Int. Cl.
*H04L 12/26*  (2006.01)
*H04W 28/02*  (2009.01)
*H04W 8/00*   (2009.01)
*H04W 84/12*  (2009.01)

(52) U.S. Cl.
CPC ........ *H04W 28/0215* (2013.01); *H04W 8/005* (2013.01); *H04W 84/12* (2013.01)

(58) Field of Classification Search
CPC . H04L 12/1868; H04L 12/1881; H04L 41/30; H04L 43/0847; H04L 43/50; H04L 45/16; H04W 40/22; H04W 88/04; H04W 28/0215; H04W 8/005; H04W 84/12
See application file for complete search history.

(56) References Cited

U.S. PATENT DOCUMENTS

| | | | |
|---|---|---|---|
| 2008/0273458 A1* | 11/2008 | Guo | H04L 47/10 370/229 |
| 2009/0168681 A1* | 7/2009 | Moon | H04L 12/1854 370/312 |
| 2012/0057538 A1* | 3/2012 | Adhikari | H04L 1/0025 370/329 |
| 2015/0117235 A1* | 4/2015 | Bhanage | H04L 43/0894 370/252 |
| 2017/0331529 A1* | 11/2017 | Lee | H04B 7/0413 |

\* cited by examiner

*Primary Examiner* — Minh Trang T Nguyen (57) ABSTRACT

A method of multicast data rate selection in an access point includes: establishing respective connections between the access point and a plurality of client devices; determining whether to set a legacy client presence flag in a memory of the access point based on whether the plurality of client devices includes or does not include a legacy client device; prior to initiating a multicast transmission to the plurality of client devices, determining whether the legacy client presence flag is set; when the legacy client presence flag is set, setting a selected multicast data rate corresponding to a first maximum data rate in a subset of legacy-compatible data rates stored in the memory; and when the legacy client presence flag is not set, setting the selected multicast data rate corresponding to a second maximum data rate in a subset of non-legacy-compatible data rates stored in the memory.

20 Claims, 4 Drawing Sheets

FIG.4

METHOD, SYSTEM AND APPARATUS FOR MULTICAST DATA RATE SELECTION

BACKGROUND

Multicast transmissions may be directed to a wide variety of client devices, which may support a heterogeneous set of wireless communications standards and capabilities within those standards. Multicast access points, such as those implementing Wi-Fi networks based on the Institute of Electrical and Electronics Engineers (IEEE) 802.11 family of communication standards, are typically configured to select data rates for multicast transmissions to ensure compatibility across all of the above-mentioned standards, which may impede the performance of certain multicast applications.

Access points implementing the 802.11 standards are typically configured to select minimum data rates for multicast transmissions. That is, a multicast transmission is sent at a data rate corresponding to the minimum rate specified by the wireless standard supported by the least-capable client device. Compatibility with all client devices is therefore achieved at the cost of performance. Some multicast applications, such as video streaming, multi-party telephony and the like, suffer from reduced performance (e.g. pauses, delayed loading of buffer data, increased latency and the like) at such minimal data rates. For example, an access point operating in an 802.11b/g/n mode (that is, supporting the IEEE standards 802.11b, 802.11g, and 802.11n in the 2.4 GHz frequency band) is conventionally configured to set the data rate to 1 megabit per second (Mbps) for multicast transmissions, corresponding to the minimum supported data rate mandated by the 802.11b standard. At a data rate of 1 Mbps, however, applications such as the video streaming and multi-party telephony applications mentioned above may suffer from reduced performance, impeding the usability of those applications.

Performance issues such as those mentioned above may be resolved by disabling certain data rates at the access point and thus resulting in the selection of a greater minimum data rate for multicast transmissions. However, supported data rate settings at access points are typically applied to all transmissions. Therefore disabling low data rates will also prevent the access point from communicating with certain legacy client devices to provide other services for which the lower data rates (e.g. the 1 Mbps mentioned above) would have been suitable.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of multicast data rate selection in an access point, including: establishing respective connections between the access point and a plurality of client devices; determining whether to set a legacy client presence flag in a memory of the access point based on whether the plurality of client devices includes a legacy client device; prior to initiating a multicast transmission to the plurality of client devices, determining whether the legacy client presence flag is set; when the legacy client presence flag is set, setting a selected multicast data rate corresponding to a first maximum data rate in a subset of legacy-compatible data rates stored in the memory; and when the legacy client presence flag is not set, setting the selected multicast data rate corresponding to a second maximum data rate in a subset of non-legacy-compatible data rates stored in the memory.

Additional examples disclosed herein are directed to an access point device, comprising: a communications interface; a memory; and a connection manager configured to establish respective connections with a plurality of client devices via the communications interface; a legacy client monitor configured to determine whether to set a legacy client presence flag in the memory based on whether the plurality of client devices includes a legacy client device; a data rate selector configured to: prior to initiating a multicast transmission to the plurality of client devices, determine whether the legacy client presence flag is set; when the legacy client presence flag is set, set a selected multicast data rate corresponding to a first maximum data rate in a subset of legacy-compatible data rates stored in the memory; and when the legacy client presence flag is not set, set the selected multicast data rate corresponding to a second maximum data rate in a subset of non-legacy-compatible data rates stored in the memory.

Figure 1:
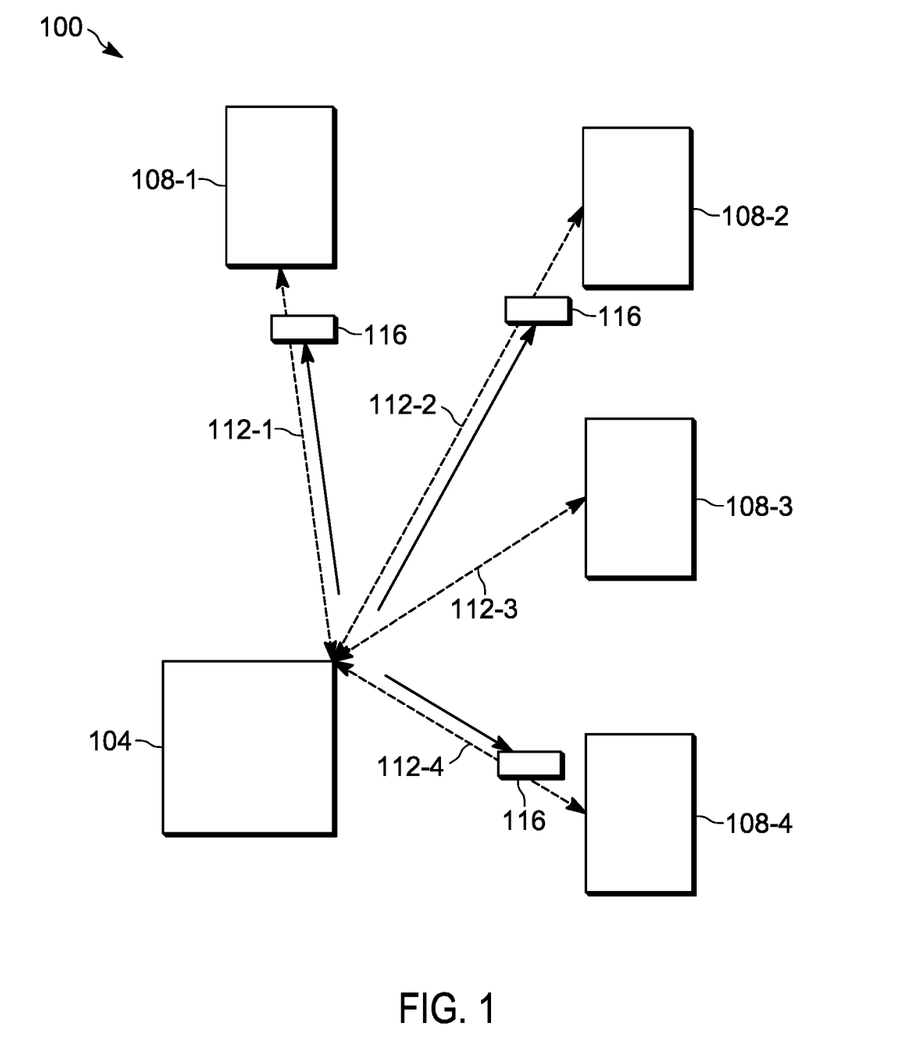
FIG. 1 is a schematic diagram of a communications system.

FIG. 1 depicts a wireless communications system 100, including a wireless access point 104 (also referred to as an access point 104) and a plurality of wireless client devices, of which four example devices 108-1, 108-2, 108-3 and 108-4 (collectively referred to as client devices 108, and generically referred to as a client device 108; this nomenclature may also be used elsewhere herein) are shown. Each client device 108 is a wireless computing device, and may be mobile (e.g., portable) or stationary (e.g. fixed to a support surface). Accordingly, each client device 108 includes any of a smart phone, a laptop computer, a desktop computer, a tablet computer, a handheld data capture device such as a barcode scanner, and the like. Each client device 108 includes a wireless communications assembly (e.g. one or more antennas, associated transceivers and processing hardware) suitable for establishing respective wireless connections 112-1, 112-2, 112-3 and 112-4 with the access point 104. Each client device 108 also includes an output device (e.g. one or more of a display, a speaker and the like) to present data received over the respective connection 112, e.g. to an operator of the client device 108.

The access point 104, as will be discussed in greater detail below, includes a wireless communications assembly for establishing the connections 112 mentioned above. The access point 104 is configured to generate and transmit multicast data 116 over at least a subset of the connections 112. For example, as shown in FIG. 1, the multicast data 116 is transmitted over the connections 112-1, 112-2 and 112-4, but not over the connection 112-3. As will now be apparent, the transmission of the multicast data 116 over a subset of the connections 112 typically does not involve separate transmissions of the multicast data 116. Rather, the access point 104 is configured to wirelessly transmit the multicast data 116 once, with addressing information contained therein indicating that the multicast data 116 is intended for receipt and processing by the client devices 108-1, 108-2 and 108-4.

In the present example, the access point 104 is implemented as a dedicated wireless local-area network (WLAN) access point, such as a wireless router, which is typically deployed in a fixed location. In other examples, however, the access point 104 is itself a client device having access point capabilities implemented via the execution of access point software by the access point 104. The access point 104 can also be, therefore, a smart phone, a laptop computer, a desktop computer, a tablet computer, a handheld data capture device such as a barcode scanner, and the like. Accordingly, the connections 112 are implemented based on the nature of the access point 104, the client devices 108, and the environment in which the access point 104 and the client devices 108 are deployed. For example, the connections 112 may define a WLAN hosted by the access point 104. In other examples, the connections 112 are peer-to-peer connections, in which one device is temporarily configured to act as an access point. Examples of such connections include the ad-hoc Wi-Fi mode of operation, in which the access point 104 and the client devices 108 form an Independent Basic Service Set (IBSS), and a Wi-Fi Direct mode of operation, in which the device temporarily assigned as the access point 104 is referred to as the group owner (GO).

In the examples described below, the connections 112 are implemented according to the IEEE 802.11 group of standards. In other examples, however, the functionality described herein may also be implemented according to other wireless communications standards.

As will be described below in greater detail, the access point 104 is configured to establish the connections 112 with the client devices 108 and, prior to initiating a multicast transmission (such as the transmission of multicast data 116), to select a data rate for the multicast transmission based at least in part on the nature of the client devices 108 to which the multicast transmission is to be addressed. Before discussing the functionality of the access point 104 in greater detail, however, certain internal components of the access point 104 will be described in connection with FIGS. 2A and 2B.

Figure 2A:
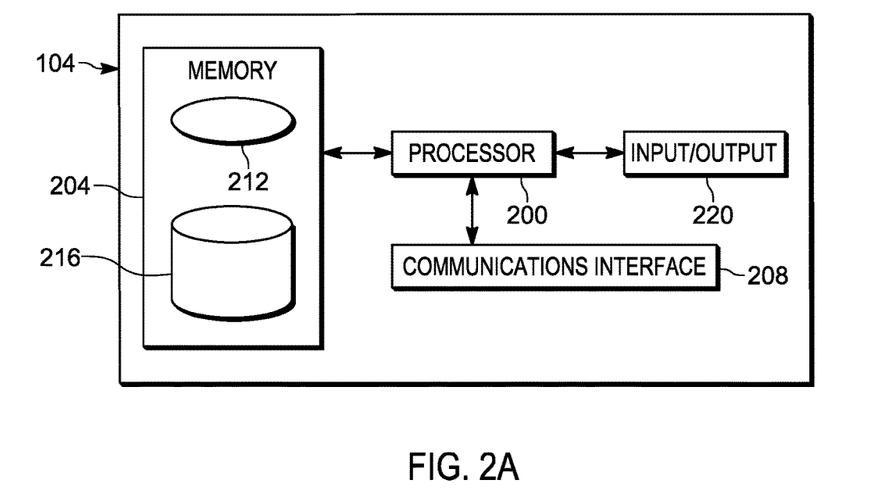
FIG. 2A is a block diagram of certain internal hardware components of the access point device of FIG. 1.

Referring to FIG. 2A, the access point 104 includes a communications controller, such as a processor 200, specifically designed to establish the connections 112 and perform connection management functions such as data rate selection for multicast transmissions. The processor 200 includes one or more integrated circuits (ICs). In some examples, the processor 200 includes one or more central processing units (CPUs). In other examples, the processor 200 includes an integrated circuit such as a Field Programmable Gate Array (FPGA), specifically designed to implement the above-mentioned connection management functions.

The processor 200 is interconnected with a non-transitory computer readable storage medium, such as a memory 204, having stored thereon computer readable instructions executable by the processor 200 for implementing the above-mentioned connection management functions. The memory 204 includes a combination of volatile (e.g. Random Access Memory or RAM) and non-volatile memory (e.g. read only memory or ROM, Electrically Erasable Programmable Read Only Memory or EEPROM, flash memory). The memory 204 includes one or more ICs. In some examples, the memory 204 and the processor 200 are deployed as subcomponents of a single IC (such as the above-mentioned FPGA).

The access point 104 also includes a communications interface 208 interconnected with the processor 200. The communications interface 208 includes suitable hardware (e.g. antennas, transmitters, receivers, network interface controllers and the like) allowing the access point 104 to communicate with other computing devices, such as the client devices 108 shown in FIG. 1. The specific components of the communications interface 208 are selected based on the wireless communication standards supported by the access point 104 and the client devices 108. In some examples, the communications interface 208 includes a plurality of antennas and supporting components (e.g. transceivers and the like), each supporting a subset of wireless communications standards. For example, the communications interface 208 can include a first antenna and supporting components for wireless communications standards employing the 2.4 GHz frequency band (e.g. 802.11b, 802.11g, and 802.11n, which may also be referred to as 802.11gn when operating at 2.4 GHz), and a second antenna and supporting components for wireless communications standards employing the 5 GHz frequency band (e.g. 802.11a, 802.11n—also referred to as 802.11an when operating at 5 GHz—and 802.11ac).

The computer readable instructions stored in the memory 204 as mentioned above include a network control application 212 (also referred to herein as the application 212). In general, via execution of the application 212 or subcomponents thereof, the processor 200 is configured to implement various functionality related to the establishment of the connections 112 and the setting of data rates for multicast transmissions. Some or all of the functionality implemented by the processor 200 as configured via the execution of the application 212 may also be performed by preconfigured hardware elements, rather than by execution of the application 212 by the processor 200. Such preconfigured hardware elements can include the above-mentioned FPGA, one or more Application-Specific Integrated Circuits (ASICs), and the like.

The memory 204 also stores a repository 216 of supported data rates for use by the processor 200 during the execution of the application 212. As will be described in greater detail below, the repository includes at least a subset of legacy-compatible data rates and a subset of non-legacy-compatible data rates, which may be preconfigured at the access point 104, or which may be received from the client devices 108.

The access point 104 also includes, in some examples, one or more input devices, and one or more output devices, generally indicated as an input/output device 220. The input devices can include a keyboard or keypad, a microphone, a touch screen, and the like. The output devices can include a display (e.g. integrated with the above-mentioned touch screen), a speaker and the like.

Figure 2B:
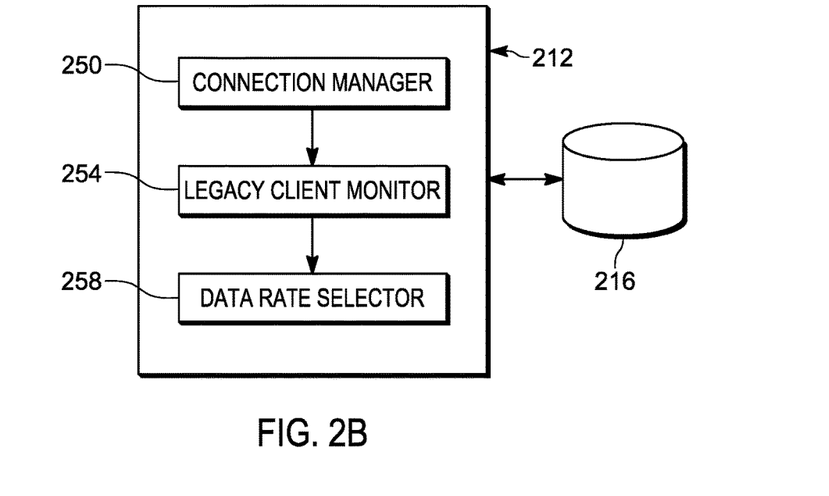
FIG. 2B is a block diagram of certain internal components of the access point device of FIG. 1.

Turning to FIG. 2B, before describing the operation of the processor 200 via the execution of the application 212 to establish the connections 112 and select data rates for use in multicast transmissions, certain components of the application 212 will be described in greater detail. As will be apparent to those skilled in the art, in other examples the components of the application 212 may be separated into distinct applications, or combined into other sets of components. Some or all of the components illustrated in FIG. 2B may also be implemented as dedicated hardware components as noted earlier, such as one or more ASICs or FPGAs. Further, some or all of the components illustrated in FIG. 2B may be implemented as components of the communications interface 208 for execution by a controller of the communications interface 208 rather than as components of the application 212.

The application 212 includes a connection manager 250 configured to detect client devices 108 and establish the connections 112 with the client devices 108. The connection manager 250 may therefore also be configured to control the communications interface 208 to transmit beacons for detection by the client devices 108, permitting the client devices 108 to request the establishment of the connections 112.

The application 212 also includes a legacy client monitor 254 (also referred to as the monitor 254), configured to monitor the subset of client devices 108 for which connections 112 have been established. Specifically, the monitor 254 is configured to determine whether the above-mentioned subset of the client devices 108 includes one or more legacy client devices. In the context employed herein, a legacy client device is a client device 108 that supports only a legacy-compatible subset of the set of data rates maintained in the repository 216. Typically, the legacy-compatible data rates are lower (i.e., slower) than non-legacy compatible data rates. Further, non-legacy client devices typically support both the legacy-compatible data rates and the non-legacy-compatible data rates. The monitor 254 is configured to set one or more parameters in the memory 204 (e.g. in the repository 216) based on whether or not any legacy client devices are detected.

The application 212 also includes a data rate selector 258, also referred to herein as the selector 258, which is configured to select a data rate for a multicast transmission based upon the data in the repository 216 (including the above-mentioned parameter(s) set by the monitor 254).

Figure 3:
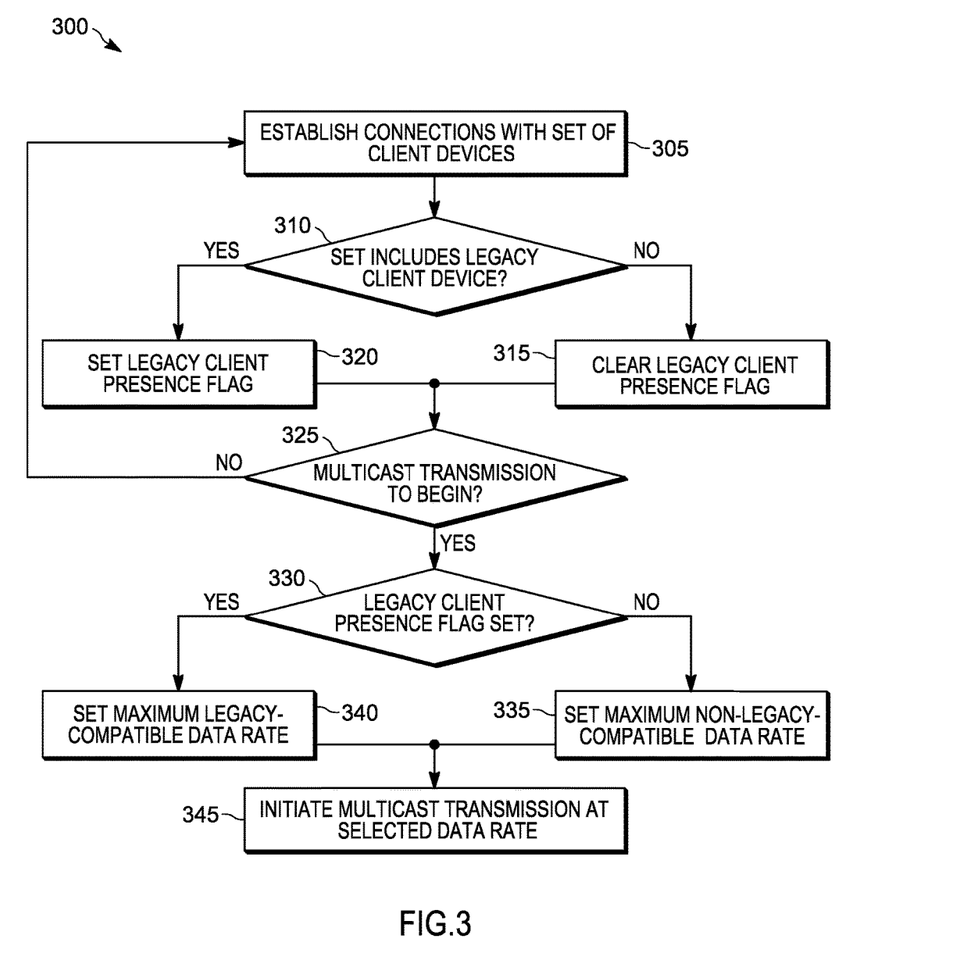
FIG. 3 is a flowchart of a method of multicast data rate selection in the system of FIG. 1.

The functionality of the application 128 will now be described in greater detail. Turning to FIG. 3, a method 300 of multicast data rate selection is shown. The method 300 will be described in conjunction with its performance on the system 100 and with reference to the components of the access point 104, as illustrated in FIGS. 2A and 2B.

Beginning at block 305, the access point 104, and specifically the connection manager 250, is configured to establish respective connections between the access point 104 and a plurality of client devices 108. The result of the performance of block 305 is shown in FIG. 1, in which the connections 112 have been established with the client devices 108. The connections 112 need not be established simultaneously, and further need not all be established before the performance of the remainder of the method 300. Instead, the method 300 is typically performed iteratively, and thus the establishment of additional connections 112 or the termination of one or more connections 112 may initiate a further performance of the method 300.

During the establishment of the connections 112, the connection manager 250 can be configured to transmit to each client device one or more of a set of data rates stored in the repository 216. The set of data rates are preconfigured at the access point 104; in order to exchange data with the access point 104, each client device 108 is required to support at least one of the set of data rates preconfigured in the repository 216. Table 1, below, illustrates example supported data rates as preconfigured in the repository 216.

TABLE 1

Access Point 104 Supported Data Rates

| Data Rate (Mbps) | Legacy/Non-Legacy |
| --- | --- |
| 1 | Legacy |
| 2 | Legacy |
| 5.5 | Legacy |
| 6 | Legacy |
| 9 | Legacy |
| 11 | Legacy |
| 12 | Non-Legacy |
| 18 | Non-Legacy |
| 24 | Non-Legacy |

The repository 216 may include additional data rates, beyond those shown in Table 1. Typically, access points store certain data rates referred to as "basic", or mandatory, data rates (indicating that clients must support at least one of the basic data rates). Additional data rates may be supported by the access point 104, but need not be supported by client devices 108. Such optional data rates are not shown above.

As seen in Table 1, the set of data rates include a subset of legacy-compatible data rates (e.g., 1, 2, 5.5, 6, 9 and 11 Mbps), and a subset of non-legacy-compatible data rates (e.g., 12, 18 and 24 Mbps). As will now be apparent to those skilled in the art, the data rates above correspond to commonly employed data rates specified by the 802.11b, 802.11g and 802.11n wireless communication standard (higher rates enabled under 802.11n are omitted from Table 1). Further, as will also be apparent to those skilled in the art, the data rates indicated as being legacy-compatible are those corresponding to the 802.11b standard (which permits a maximum data rate of 11 Mbps). The data rates need not be stored in the repository 216 in the format shown in Table 1—the format above is provided simply for illustrative purposes.

In some examples, at block 305 the access point 104 can also be configured to receive a group of supported data rates from each client device 108, indicating which data rates the respective client device 108 supports. The data rates received from the client devices 108 can also be accompanied by an indicator, for each data rate, of whether the data rate is legacy-compatible or non-legacy-compatible. In such examples, the supported data rates received from each client device 108 can be stored in the repository 216, for example as shown below in Table 2.

TABLE 2

Client Device 108 Supported Data Rates

| Client Device | Legacy Data Rates (Mbps) | Non-Legacy Data Rates (Mbps) |
| --- | --- | --- |
| 108-1 | 1, 2, 5.5, 6, 9, 11 | N/A |
| 108-2 | 1, 2, 5.5, 11 | 18, 24 |

TABLE 2-continued

Client Device 108 Supported Data Rates

| Client Device | Legacy Data Rates (Mbps) | Non-Legacy Data Rates (Mbps) |
|---|---|---|
| 108-3 | 1, 5.5, 6 | N/A |
| 108-4 | 1, 2, 5.5, 6, 9, 11 | 18, 24 |

As with Table 1, the contents of Table 2 need not be stored in the repository 216 in the format shown above. For example, the client-supported data rates need not be divided into legacy-compatible and non-legacy-compatible columns. Rather, whether or not a given data rate is legacy-compatible may be indicated via comparison with the list in Table 1, via a separate indicator such as the wireless standard to which each data rate corresponds, and the like.

As will be apparent to those skilled in the art from Table 2, the client devices 108-2 and 108-4 support both legacy-compatible and non-legacy compatible data rates, while the client devices 108-1 and 108-3 support only legacy-compatible data rates. For example, the client devices 108-1 and 108-3 may have communications assemblies implementing only the IEEE 802.11b standard, while the client devices 108-2 and 108-4 may have communications assemblies implementing the 802.11b standard as well as one or both of the 802.11g and 802.11n standards. Further, it will be apparent from Table 2 that the client device 108-3 supports only a subset of the 802.11b data rates.

At block 310, the monitor 254 is configured to determine whether the set of client devices 108 with which the access point 104 has active connections includes one or more legacy client devices. For example, the monitor 254 can be configured to consult the repository 216 (e.g., the data in Table 2) to determine whether any of the client devices 108 only support data rates in the legacy subset shown in Table 1. The determination at block 310 can be repeated periodically, or when there is a change in the population of client devices 108 connected to the access point 104 (e.g. when a new client device 108 requests a connection, or when a previously connected client device 108 disconnects).

When the determination at block 310 is negative, the monitor 254 is configured to clear a legacy client presence flag maintained in the memory 204 (for example, in the repository 216) at block 315. Clearing the legacy client presence flag includes, in some examples, setting the flag to a value indicating that no legacy client devices are currently connected to the access point 104. The flag may, for example, be a binary flag, and clearing the flag therefore includes setting the flag to a value of "0". In other examples, clearing the flag can include deleting any previously stored value for the flag (i.e., indicating the absence of legacy client devices with a blank flag rather than with a predetermined value).

When the determination at block 310 is affirmative, however, the monitor 254 is configured to set the legacy client presence flag at block 320. In the present example, setting the legacy client presence flag includes setting the flag to a predetermined value indicating that one or more legacy client devices is currently connected to the access point 104. For example, when the flag is a binary flag as noted above, the monitor 254 can be configured to set the flag to a value of "1" at block 320.

The legacy client presence flag, in the present example, is one of the values contained in the Extended Rate PHY (ERP) information element (IE) conventionally stored by access points implementing the IEEE 802.11b, 802.11g, and 802.11n (in the 2.4 GHz band) standards. As will now be apparent to those skilled in the art, the ERP IE includes a "NonERP_Present" value that is typically set to "1" when a legacy client device (supporting only 802.11b data rates) is present, and to "0" when no legacy client device is present. The NonERP_Present value is conventionally employed by access points 104 in determining whether to implement a protection feature to prevent legacy client devices from interfering with the transmissions of non-legacy client devices (or to mitigate such interference). However, as will be described below in embodiments of the present disclosure, the access point 104 also employed the NonERP_Present value to implement additional functionality. In other examples, the monitor 254 may employ a flag separate from the above-mentioned NonERP_Present value to indicate the presence of absence of legacy client devices.

From either of blocks 315 and 320, the application 212 is configured to proceed to block 325. At block 325, the data rate selector 258 is configured to determine whether a multicast transmission is to be initiated. For example, the determination at block 325 can be made responsive to a request from a multicast application executed by the processor 200 to initiate a multicast transmission. When the determination at block 325 is negative, the performance of the method 300 returns to block 305. When the determination at block 325 is affirmative, however, the performance of the method 300 proceeds to block 330.

At block 330, the selector 258 is configured to determine whether the legacy client presence flag stored in the memory 204 is set. That is, following the example discussed above in connection with blocks 315 and 320, the selector 258 is configured to determine whether the value of the NonERP_Present flag is "1". More generally, the selector 258 is configured to determine, at block 330, whether the legacy client presence flag indicates that the access point 104 is currently connected with a legacy client device.

When the determination at block 330 is negative (i.e., when the flag indicates that there is no legacy client device currently connected to the access point 104), the selector 258 proceeds to block 335. At block 335 the selector 258 is configured to set a selected multicast data rate corresponding to the maximum one of the non-legacy-compatible data rates stored in the memory 204 (specifically, in the repository 216). Referring to Table 1, the selector 258 is configured to select the maximum one of the non-legacy-compatible subset of data rates. In the present example, the maximum non-legacy-compatible data rate is 24 Mbps.

When the determination at block 330 is affirmative (i.e., when the flag indicates that at least one legacy client device is currently connected to the access point 104), the selector 258 instead proceeds to block 340. At block 340 the selector 258 is configured to set a selected multicast data rate corresponding to the maximum one of the legacy-compatible data rates stored in the memory 204 (specifically, in the repository 216). Referring again to Table 1, at block 340 the selector 258 is configured to select the maximum one of the legacy-compatible subset of data rates. In the present example, the maximum legacy-compatible data rate is 11 Mbps.

In other examples, at block 340 the selector 258 is configured to consult not only the preconfigured data rates stored in the memory 204 (as shown in Table 1), but also the data rates received from the client devices 108 at block 305 (as shown in Table 2). In particular, in such examples the selector 258 is configured to select the maximum legacy-compatible data rate that is both present in the preconfigured data rates of Table 1 and supported by each client device 108 as shown in Table 2. Thus, in the present example, at block 340 the selector 258 can be configured to select a data rate of 5.5 Mbps rather than the 11 Mbps mentioned above, because the client device 108-3 does not support 11 Mbps and the client device 108-2 does not support 6 Mbps (but both devices 108-2 and 108-3 support 5.5 Mbps).

The selector 258 can also be configured, at block 340, to select the maximum legacy-compatible data rate that is both present in the preconfigured data rates of Table 1 and supported by each of the client devices 108 to which the multicast transmission is to be directed (rather than all of the client devices 108 represented in Table 2). For example, the above-mentioned request from a multicast application may include identifiers of a plurality of client devices 108. The selector 258 is configured, in some implementations, to retrieve the supported data rates for only those identified client devices 108, and to select the maximum legacy-compatible data rate from the retrieved client device records that also appears in the preconfigured data rates of Table 1. In such an implementation, therefore, the selector 258 is configured to select a data rate of 11 Mbps at block 340 because, as shown in FIG. 1, the client device 108-3 is not among those to which the multicast data 116 is sent.

Following the setting of a selected data rate at block 335 or block 340, the selector 258 is configured to initiate the multicast transmission at block 345, using the selected data rate.

Variations to the above methods and systems are contemplated. For example, turning to FIG. 4, a method 400 of multicast data rate selection is shown, in which blocks performed in the same way to those of the method 300 are assigned matching reference numerals to the blocks of FIG. 3 but in which the leading "3" has been replaced with a leading "4". Accordingly, the blocks 405, 410, 415, 420, 425, 430, 435 and 440 are performed as described above in connection with the blocks 305, 310, 315, 320, 325, 330, 335 and 330, respectively. The method 400 includes certain additional functionality, however, as discussed below.

Figure 4:
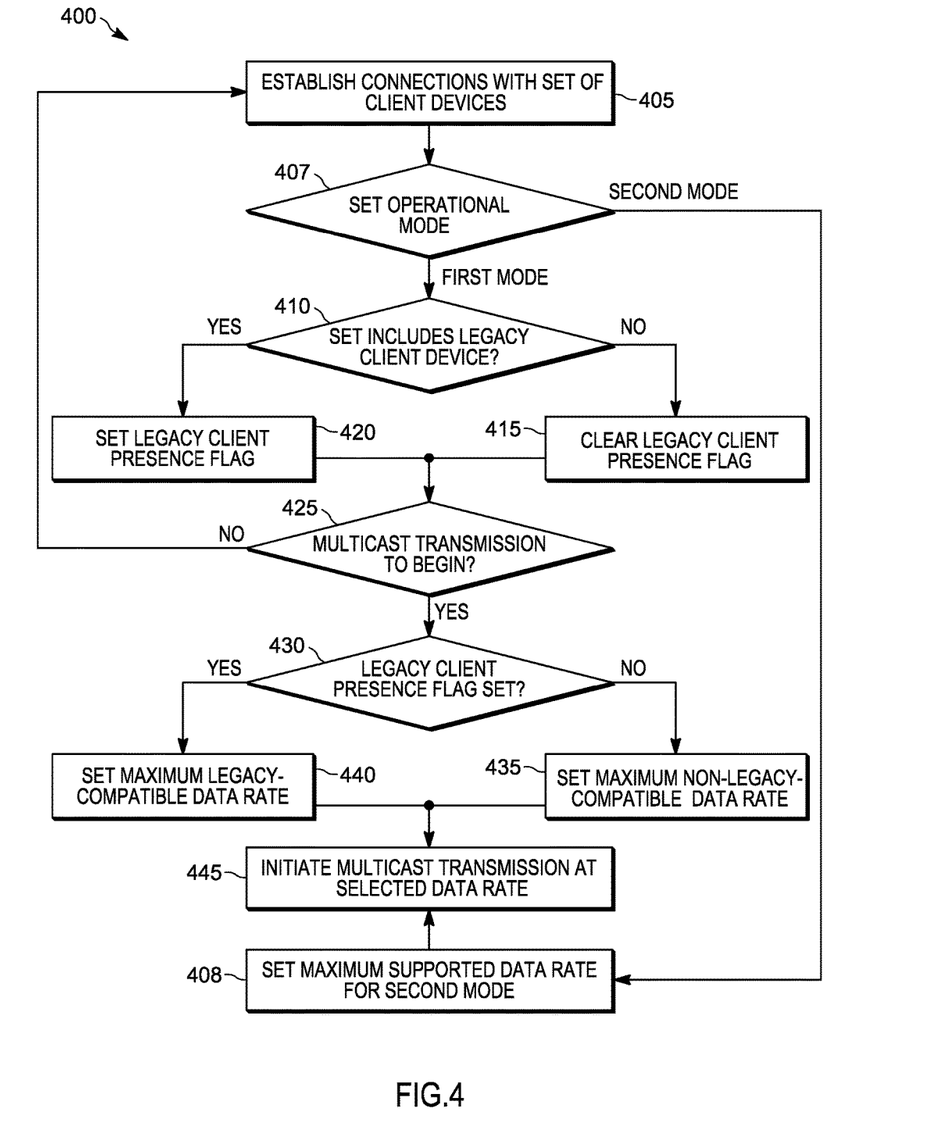
FIG. 4 is a flowchart of a further method of multicast data rate selection in the system of FIG. 1.

Following the performance of block 405, but prior to performing block 410, at block 407 the monitor 254 is configured to set an operational mode for the access point 104. As noted earlier, in some examples the communications interface 208 of the access point 104 includes components implementing wireless standards at a first frequency band (e.g., 2.4 GHz), and components implementing wireless standards at a second frequency band (e.g., 5 GHz). Additional components may also be included to implement wireless standards at a third frequency band (e.g., 60 GHz). The access point 104, in other words, is capable of operating in two or more distinct operational modes, typically distinguished by corresponding operating frequency bands.

In such examples, the repository 216 includes a set of data rates for each operational mode. Table 3, below, illustrates that the legacy-compatible and non-legacy compatible data rates shown earlier in Table 1 correspond to a first operational mode (e.g., an IEEE 802.11 BGN operational mode). Table 3 also contains a set of supported data rates corresponding to a second operational mode (e.g. an IEEE 802.11 A/N/AC operational mode).

TABLE 3

Access Point 104 Supported Data Rates

| First Operational Mode | | Second Operational Mode |
|---|---|---|
| Data Rate (Mbps) | Legacy/Non-Legacy | Data Rate (Mbps) |
| 1 | Legacy | 6 |
| 2 | Legacy | 9 |
| 5.5 | Legacy | 12 |
| 6 | Legacy | 18 |
| 9 | Legacy | 24 |
| 11 | Legacy | |
| 12 | Non-Legacy | |
| 18 | Non-Legacy | |
| 24 | Non-Legacy | |

The operational mode is set at block 407 based on the nature of the client devices 108 with which connections 112 were established at block 405. Specifically, the monitor 254 is configured to select the first operational mode when any of the connected client devices 108 support only a standard corresponding to the first operational mode. Otherwise (e.g., when all of the client devices 108 connected to the access point 104 support at least one of the standards corresponding to the second operational mode), the monitor 254 is configured to select the second operational mode, and proceed to block 408 rather than to block 410.

At block 408, the selector 258 is configured to set the selected multicast data rate as the maximum supported data rate corresponding to the second operational mode. In contrast, at blocks 435 and 440, the selector 258 is configured to select data rates as discussed above in connection with blocks 335 and 340, from the data rates corresponding to the first operational mode as shown in Table 3. Following the performance of block 408, the performance of the method 400 proceeds directly to block 445. Although not illustrated in FIG. 4, block 425 may be performed before block 408 (that is, the performance of the method 400 may advance from block 407 to block 408 via block 425).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of multicast data rate selection in an access point, the method comprising:
   establishing respective connections between the access point and a plurality of client devices;
   determining whether to set a legacy client presence flag in a memory of the access point based on whether the plurality of client devices includes a legacy client device;
   prior to initiating a multicast transmission to the plurality of client devices, determining whether the legacy client presence flag is set;
   when the legacy client presence flag is set, setting a selected multicast data rate corresponding to a first maximum data rate in a subset of legacy-compatible data rates stored in the memory; and
   when the legacy client presence flag is not set, setting the selected multicast data rate corresponding to a second maximum data rate in a subset of non-legacy-compatible data rates stored in the memory.

2. The method of claim 1, further comprising:
   initiating the multicast transmission to the plurality of client devices at the selected multicast data rate.

3. The method of claim 1, wherein the subset of legacy-compatible data rates and the subset of non-legacy-compatible data rates include preconfigured legacy-compatible data rates and preconfigured non-legacy-compatible data rates.

4. The method of claim 3, further comprising:
   while establishing the connections with the plurality of client devices, receiving, from each client device:
      a group of data rates supported by the client device; and
      for each data rate in the group, an indication of whether the data rate is one of a legacy-compatible data rate and a non-legacy-compatible data rate; and
   storing the data rates received from the client devices in a respective one of the subset of legacy-compatible data rates and the subset of non-legacy-compatible data rates.

5. The method of claim 4, wherein the first maximum data rate is a maximum legacy-compatible data rate received from the client devices that matches one of the preconfigured legacy-compatible data rates; and
   wherein the second maximum data rate is a maximum non-legacy-compatible data rate received from the client devices that matches one of the preconfigured non-legacy-compatible data rates.

6. The method of claim 1, wherein the legacy client presence flag comprises a bit value.

7. The method of claim 1, further comprising:
   prior to determining whether the legacy client presence flag is set, setting a selected operational mode corresponding to one of a first frequency band and a second frequency band; and
   determining whether the legacy client presence flag is set responsive to setting the operational mode corresponding to the first frequency band.

8. The method of claim 7, further comprising:
   storing an additional set of data rates corresponding to the second frequency band; and
   responsive to setting the operational mode corresponding to the second frequency band, setting the selected multicast data rate corresponding to a maximum one of the additional set of data rates.

9. The method of claim 1, wherein the second maximum data rate is greater than the first maximum data rate.

10. The method of claim 1, wherein the legacy client device supports only the Institute of Electrical and Electronics Engineers (IEEE) 802.11b standard; and
wherein the non-legacy-compatible data rates correspond to any one or more of the IEEE 802.11g, 802.11a, 802.11n, and 802.11ac standards.

11. An access point device, comprising:
a communications interface;
a memory; and
a connection manager configured to establish respective connections with a plurality of client devices via the communications interface;
a legacy client monitor configured to determine whether to set a legacy client presence flag in the memory based on whether the plurality of client devices includes a legacy client device;
a data rate selector configured to:
prior to initiating a multicast transmission to the plurality of client devices, determine whether the legacy client presence flag is set;
when the legacy client presence flag is set, set a selected multicast data rate corresponding to a first maximum data rate in a subset of legacy-compatible data rates stored in the memory; and
when the legacy client presence flag is not set, set the selected multicast data rate corresponding to a second maximum data rate in a subset of non-legacy-compatible data rates stored in the memory.

12. The access point device of claim 11, the data rate selector further configured to:
initiate the multicast transmission to the plurality of client devices at the selected multicast data rate.

13. The access point device of claim 11, wherein the subset of legacy-compatible data rates and the subset of non-legacy-compatible data rates include preconfigured legacy-compatible data rates and preconfigured non-legacy-compatible data rates.

14. The access point device of claim 13, the connection manager further configured to:
while establishing the connections with the plurality of client devices, receive, from each client device:
a group of data rates supported by the client device; and
for each data rate in the group, an indication of whether the data rate is one of a legacy-compatible data rate and a non-legacy-compatible data rate; and
store the data rates received from the client devices in a respective one of the subset of legacy-compatible data rates and the subset of non-legacy-compatible data rates.

15. The access point device of claim 14, wherein the first maximum data rate is a maximum legacy-compatible data rate received from the client devices that matches one of the preconfigured legacy-compatible data rates; and
wherein the second maximum data rate is a maximum non-legacy-compatible data rate received from the client devices that matches one of the preconfigured non-legacy-compatible data rates.

16. The access point device of claim 11, wherein the legacy client presence flag comprises a bit value.

17. The access point device of claim 11, the legacy client monitor further configured to set a selected operational mode corresponding to one of a first frequency band and a second frequency band;
the data rate selector further configured to determine whether the legacy client presence flag is set responsive to the selected operational mode corresponding to the first frequency band.

18. The access point device of claim 17, the memory storing an additional set of data rates corresponding to the second frequency band;
wherein the data rate selector is configured, responsive to the selected operational mode corresponding to the second frequency band, to set the selected multicast data rate corresponding to a maximum one of the additional set of data rates.

19. The access point device of claim 11, wherein the second maximum data rate is greater than the first maximum data rate.

20. The access point device of claim 11, wherein the legacy client device supports only the Institute of Electrical and Electronics Engineers (IEEE) 802.11b standard; and
wherein the non-legacy-compatible data rates correspond to any one or more of the IEEE 802.11g, 802.11a, 802.11n, and 802.11ac standards.

* * * * *